United States Patent
Miyazaki et al.

(10) Patent No.: US 12,237,465 B2
(45) Date of Patent: Feb. 25, 2025

(54) SOLID ELECTROLYTE AND METHOD FOR PRODUCING SOLID ELECTROLYTE

(71) Applicants: NAGOYA INSTITUTE OF TECHNOLOGY, Nagoya (JP); NGK INSULATORS, LTD., Nagoya (JP)

(72) Inventors: Reona Miyazaki, Nagoya (JP); Harunobu Onishi, Nagoya (JP); Satoshi Ozaki, Nagoya (JP); Toshihiro Yoshida, Nagoya (JP); Yuji Katsuda, Tsushima (JP); Yosuke Sato, Hashima-Gun (JP); En Yagi, Nagoya (JP)

(73) Assignees: Nagoya Institute of Technology, Nagoya (JP); NGK INSULATORS, LTD., Nagoya (JP)

( * ) Notice: Subject to any disclaimer, the term of this patent is extended or adjusted under 35 U.S.C. 154(b) by 697 days.

(21) Appl. No.: 17/447,305

(22) Filed: Sep. 10, 2021

(65) Prior Publication Data

US 2021/0408583 A1    Dec. 30, 2021

Related U.S. Application Data

(63) Continuation of application No. PCT/JP2019/041710, filed on Oct. 24, 2019.

(30) Foreign Application Priority Data

Mar. 26, 2019 (WO) .................. PCT/JP2019/012917

(51) Int. Cl.
| | |
|---|---|
| H01M 10/0562 | (2010.01) |
| H01G 11/56 | (2013.01) |
| H01G 11/84 | (2013.01) |

(52) U.S. Cl.
CPC ........ *H01M 10/0562* (2013.01); *H01G 11/56* (2013.01); *H01G 11/84* (2013.01); *H01M 2300/0068* (2013.01)

(58) Field of Classification Search
CPC ...... H01M 10/0562; H01M 2300/0068; H01G 11/56; H01G 11/84
See application file for complete search history.

(56) References Cited

U.S. PATENT DOCUMENTS

| | | | | |
|---|---|---|---|---|
| 6,368,746 | B1* | 4/2002 | Takada | .................. H01M 4/621 |
| | | | | 429/208 |
| 2015/0340734 | A1 | 11/2015 | Homma et al. | |
| 2020/0343585 | A1 | 10/2020 | Miyazaki et al. | |
| 2021/0408584 | A1* | 12/2021 | Onishi | .............. H01M 10/0562 |

FOREIGN PATENT DOCUMENTS

| | | |
|---|---|---|
| CN | 108172757 A | 6/2018 |
| JP | 49-081898 A1 | 8/1974 |
| JP | 05-054712 A1 | 3/1993 |
| JP | 2010-212153 A1 | 9/2010 |
| JP | 2015-176854 A1 | 10/2015 |
| JP | 2015-196621 A1 | 11/2015 |
| JP | 2017-095351 A1 | 6/2017 |
| JP | 2017-224427 A1 | 12/2017 |
| WO | 2014/125633 A1 | 8/2014 |
| WO | WO-2016194705 A1 * 12/2016 ............... H01B 1/06 |
| WO | 2019/156158 A1 | 8/2019 |

OTHER PUBLICATIONS

K. Singh, F.C. Raghuwanshi, V.K. Deshpande, Li2SO4: LiOH eutectic system, a promising solid electrolyte, Solid State Ionics, vols. 28-30, Part 1, 1988, pp. 267-270 (Year: 1988).*
Deshpande et al., Electrical Conductivity of the Li2SO4—LiOH System, Solid State Ionics, vol. 18-19, Part 1, 1986, pp. 378-381 (Year: 1986).*
Nagao et al., Preparation and characterization of glass solid electrolytes in pseudoternary system Li3BO3—Li2SO4—Li2CO3, Solid State Ionics, vol. 308, 2017, pp. 68-76 (Year: 2017).*
U.S. Appl. No. 17/447,313, filed Sep. 10, 2021.
International Search Report and Written Opinion (Application No. PCT/JP2019/041710) dated Dec. 10, 2019 (with English translation).
Deshpande et al., "*Electrical Conductivity of $Li_2SO_4$ —LiOH System*," Solid State Ionics 18 and 19, Department of Physics, Nagpur University, Nagpur 440 010 (India), (1986), pp. 378-381.
Extended European Search Report (Application No. 19921628.4) dated Oct. 25, 2022.

* cited by examiner

*Primary Examiner* — Ula C Ruddock
*Assistant Examiner* — Olivia Mason Ruggiero
(74) *Attorney, Agent, or Firm* — BURR PATENT LAW, PLLC

(57) ABSTRACT

Provided is a solid electrolyte which is identified as $3LiOH \cdot Li_2SO_4$ by diffractometry. The solid electrolyte further contains boron.

8 Claims, No Drawings

SOLID ELECTROLYTE AND METHOD FOR PRODUCING SOLID ELECTROLYTE

CROSS-REFERENCE TO RELATED APPLICATIONS

This application is a continuation application of PCT/JP2019/041710 filed Oct. 24, 2019, which claims priority to PCT/JP2019/012917 filed Mar. 26, 2019, the entire contents all of which are incorporated herein by reference.

BACKGROUND OF THE INVENTION

1. Field of the Invention

The present invention relates to a solid electrolyte and a method for manufacturing the solid electrolyte.

2. Description of the Related Art

Solid electrolytes used in electric storage devices, such as lithium ion secondary batteries and capacitors have been extensively studied and developed in recent years. Particularly, development of the solid electrolytes has been eagerly awaited that can maintain sufficient lithium ion conductivity from room temperature to high temperature. Non-Patent Literature 1 proposes use of a solidified body obtained by homogenously melting and then quenching $Li_2SO_4$ and LiOH as a solid electrolyte. Particularly, this solid electrolyte can be used in a device operable at low temperature.

CITATION LIST

Non-Patent Literature

Non-Patent Literature 1: V. K. DESHPANDE, F. C. RAGHUWANSHI AND K. SINGH, "ELECTRICAL CONDUCTIVITY OF THE Li2SO4-LiOH SYSTEM", Solid State Ionics 18 & 19 (1986) 378-381

SUMMARY OF THE INVENTION

However, the solid electrolyte described in Non-Patent Literature 1 does not have sufficiently high lithium ion conductivity at room temperature. In addition, the conductivity of the solid electrolyte in Non-Patent Literature 1 is less temperature dependent, so that the effect of increasing conductivity due to temperature rise cannot be expected. That is, this solid electrolyte is not a material having sufficient lithium ion conductivity from room temperature to high temperature. In response to these problems, the present inventors have obtained knowledge that a solid electrolyte expressed by $3LiOH \cdot Li_2SO_4$ exhibits high lithium ion conductivity at 25° C. However, it has been found that there is another problem that the lithium ion conductivity tends to decrease when the material of the above composition alone is held at high temperature for a long time.

The present inventors have currently found that by further adding boron to the solid electrolyte identified as $3LiOH \cdot Li_2SO_4$, a reduction of the lithium ion conductivity can be significantly suppressed even after being held at high temperature for a long time.

Therefore, an object of the present invention is to provide a $3LiOH \cdot Li_2SO_4$-based solid electrolyte which is capable of significantly suppressing a reduction of the lithium ion conductivity even after being held at high temperature for a long time.

According to an aspect of the present invention, there is provided a solid electrolyte, wherein the solid electrolyte is identified as $3LiOH \cdot Li_2SO_4$ by X-ray diffractometry and further comprises boron.

According to another aspect of the present invention, there is provided a method for manufacturing the solid electrolyte, comprising the step of
melting and then cooling a raw material including LiOH, $Li_2SO_4$ and $Li_3BO_3$ to form a solidified body.

According to another aspect of the present invention, there is provided a method for manufacturing the solid electrolyte, comprising the step of
mixing and grinding a powder including LiOH, $Li_2SO_4$, and $Li_3BO_3$ by mechanical milling to synthesize a solid electrolyte powder.

DETAILED DESCRIPTION OF THE INVENTION

Solid Electrolyte

A solid electrolyte according to the present invention is a solid electrolyte identified as $3LiOH \cdot Li_2SO_4$ by X-ray diffractometry. This solid electrolyte further contains boron. By further adding boron to the solid electrolyte identified as $3LiOH \cdot Li_2SO_4$, a reduction of lithium ion conductivity can be significantly suppressed even after being held at high temperature for a long time. In other words, as described above, the present inventors have obtained knowledge that a solid electrolyte expressed by $3LiOH \cdot Li_2SO_4$ exhibits high lithium ion conductivity at 25° C. However, it has been found that there is another problem that the lithium ion conductivity tends to decrease when the solid electrolyte of the above composition alone is held at high temperature for a long time. In this regard, the problem can be solved by further adding boron to the solid electrolyte identified as $3LiOH \cdot Li_2SO_4$. Although mechanisms by which the inclusion of boron can improve ion conductivity retention ratio are not clear, according to X-ray diffractometry, a diffraction peak of $3LiOH \cdot Li_2SO_4$ is slightly shifted to high angle side by the inclusion of boron, and thus it is inferred that boron is taken into one of sites in crystal structure of $3LiOH \cdot Li_2SO_4$ to improve the stability of the crystal structure against temperature.

Therefore, the solid electrolyte according to the present invention is preferably used in electric storage devices such as lithium ion secondary batteries and capacitors, and particularly preferably used in lithium ion secondary batteries. The lithium ion secondary battery may be an all-solid-state battery (for example, an all-solid-state lithium ion secondary battery). The lithium ion secondary battery may also be a liquid battery (for example, a lithium-air battery) comprising a solid electrolyte used as a separator, facing electrodes, and electrolytic solutions between the separator and the facing electrodes.

As described above, the solid electrolyte according to the present invention is a solid electrolyte identified as $3LiOH \cdot Li_2SO_4$ by X-ray diffractometry. In other words, the solid electrolyte contains $3LiOH \cdot Li_2SO_4$ as a main phase. The inclusion of $3LiOH \cdot Li_2SO_4$ in the solid electrolyte can be confirmed by using 032-0598 in the ICDD database for the identification in an X-ray diffraction pattern. Here, "$3LiOH \cdot Li_2SO_4$" refers to a composition that can be considered to have the same crystal structure as $3LiOH \cdot Li_2SO_4$ and does not necessarily have the same crystal composition as $3LiOH \cdot Li_2SO_4$. In other words, a composition of LiOH and $Li_2SO_4$ in a ratio other than 3:1 also falls within the solid electrolyte of the present invention as long as it has a crystal structure equivalent to that of $3LiOH \cdot Li_2SO_4$. Therefore, even the solid electrolyte containing boron (for example, $3LiOH \cdot Li_2SO_4$ in which boron is dissolved to form a solid solution having the X-ray diffraction peak shifted to a high angular side) is referred to as $3LiOH \cdot Li_2SO_4$ herein as long as the solid electrolyte is considered to have the same crystal structure as $3LiOH \cdot Li_2SO_4$. Similarly, inclusion of unavoidable impurities is also acceptable in the solid electrolyte of the present invention.

Therefore, the solid electrolyte may also include a different phase in addition to the main phase of $3LiOH \cdot Li_2SO_4$. The different phase may contain multiple elements selected from Li, O, H, S, and B, or only consist of multiple elements selected from Li, O, H, S, and B. Examples of the different phase include LiOH, $Li_2SO_4$, and/or $Li_3BO_3$ derived from raw materials. These different phases are regarded as residues of unreacted raw materials during the formation of $3LiOH \cdot Li_2SO_4$, but the amount of the different phases except $Li_3BO_3$ should be small since the different phases do not contribute to lithium ion conduction. A different phase containing boron, such as $Li_3BO_3$, may be included in the desired amount since the different phase may contribute to improvement in the lithium ion conductivity retention ratio after being held at high temperature for a long time. The solid electrolyte may be composed of a single phase of $3LiOH \cdot Li_2SO_4$ in which boron is dissolved to form a solid solution.

The solid electrolyte of the present invention further contains boron. A molar ratio of boron B to sulfur S contained in the solid electrolyte (B/S) is preferably more than 0.002 and less than 1.0, more preferably 0.003 or more and 0.9 or less, and still more preferably 0.005 or more and 0.8 or less. When a boron content is small, the retention ratio of lithium ion conductivity at high temperature reduces. However, when the B/S is in the above range, the retention ratio of the lithium ion conductivity can be improved. When the boron content is large, an absolute value of lithium ion conductivity may be reduced. However, when the B/S is in the above range, the absolute value of the lithium ion conductivity can increase since the content of an unreacted different phase containing boron reduces.

In an X-ray diffraction pattern of the solid electrolyte according to the present invention observed with a radiation source of CuKα, a full-width at half-maximum of the peak in the vicinity of $2\theta=18.4°$ identified as $3LiOH \cdot Li_2SO_4$ is preferably 0.500° or less, more preferably 0.400° or less, and still more preferably 0.200° or less. In such a range, the lithium ion conductivity retention ratio can be further improved after being held at high temperature for a long time. The above full-width at half-maximum is preferred since the smaller full-width at half-maximum means the higher crystallinity. The lower limit value is not particularly limited, but is typically 0.08° or more, and more typically 0.1° or more.

In the X-ray diffraction pattern of the solid electrolyte according to the present invention observed with a radiation source of CuKα, the $I_{LiOH}/I_{LHS}$ ratio of a peak intensity $I_{LiOH}$ in the vicinity of $2\theta=20.5°$ identified as LiOH to a peak intensity $I_{LHS}$ in the vicinity of $2\theta=18.4°$ identified as $3LiOH \cdot Li_2SO_4$ is preferably less than 0.234, more preferably 0.230 or less, and still more preferably 0.200 or less. A large number of LiOH may result in a reduction of an absolute value of the lithium ion conductivity, but the absolute value of the lithium ion conductivity can increase since a content of LiOH in the above range becomes low.

In the X-ray diffraction pattern of the solid electrolyte of the present invention observed with a radiation source of CuKα, the $I_{Li2SO4}/I_{LHS}$ ratio of a peak intensity $I_{Li2SO4}$ in the vicinity of $2\theta=22.2°$ identified as $Li_2SO_4$ to the peak intensity $I_{LHS}$ in the vicinity of $2\theta=18.4°$ identified as $3LiOH \cdot Li_2SO_4$ is preferably less than 1.10, more preferably 0.50 or less, and still more preferably 0.20 or less. A large number of $Li_2SO_4$ may result in a reduction of an absolute value of the lithium ion conductivity, but the absolute value of the lithium ion conductivity can increase since a content of $Li_2SO_4$ in the above range becomes low.

The solid electrolyte according to the present invention may be a green compact, but is preferably a melt-solidified body (i.e., a product of solidified after hot melting).

Manufacturing Method

According to a preferred aspect of the present invention, the solid electrolyte of the present invention can be manufactured through a step of melting and cooling a raw material including LiOH, $Li_2SO_4$ and $Li_3BO_3$ to form a solidified body. From the viewpoint of ion conductivity, the raw material for use in this case preferably has a composition expressed by $xLiOH \cdot Li_2SO_4 \cdot yLi_3BO_3$, wherein $2.0 \leq x \leq 4$ and $0.002 \leq y \leq 1$, but is not limited thereto as long as desired properties can be obtained (e.g., $1.0 \leq x \leq 4$ is also acceptable). For example, the solid electrolyte can be manufactured by (a) cooling a melt of raw materials including LiOH, $Li_2SO_4$, and $Li_3BO_3$ (preferably, raw materials of the above composition) to form a solidified body; (b) grinding or mechanically milling the solidified body to produce solid electrolyte powder; and (c) shaping the solid electrolyte powder or remelting, cooling, and then solidifying the solid electrolyte powder to form the solid electrolyte. Cooling the melt in (a) may involve either quenching or slow cooling (e.g., cooling in a furnace). The mechanical milling in (b) can be carried out by placing balls, such as zirconia balls, and the solidified body of the solid electrolyte into a zirconia container or the like to grind the solidified body in accordance with a known technique under known conditions. Shaping in Step (c) can be carried out by various techniques, such as pressing (e.g., metallic mold pressing or rubber pressing), and preferably by metallic mold pressing. During cooling after remelting the solid electrolyte powder in Step (c), the temperature drop rate is preferably 10 to 1000° C./h and more preferably 10 to 100° C./h.

According to another preferred aspect of the present invention, the solid electrolyte can be manufactured through a step of mixing and grinding powder including LiOH, $Li_2SO_4$, and $Li_3BO_3$ by mechanical milling to synthesize solid electrolyte powder. From the viewpoint of ion conductivity, the powder for use in this case preferably includes LiOH powder, $Li_2SO_4$ powder, and $Li_3BO_3$ powder in a blending ratio that results in a raw material composition expressed by $xLiOH \cdot Li_2SO_4 \cdot yLi_3BO_3$, wherein $2.0 \leq x \leq 4$ and $0.002 \leq y \leq 1$, but is not limited thereto as long as desired properties can be obtained (e.g., $1.0 \leq x \leq 4$ is also acceptable). For example, the solid electrolyte can be manufactured by (a) mixing and grinding LiOH powder, $Li_2SO_4$ powder, and $Li_3BO_3$ powder (preferably in a blending ratio that results in the above composition) by mechanical milling to synthesize solid electrolyte powder and (b) shaping the solid electrolyte powder or heating, melting, and then cooling the solid electrolyte powder to form the solid electrolyte. The mechanical milling in (a) can be carried out by placing balls, such as zirconia balls, and LiOH powder, $Li_2SO_4$ powder, and $Li_3BO_3$ powder into a container such as a zirconia container to mix and grind in accordance with a known technique under known conditions. Mixing and grinding can accelerate the synthetic reaction of the solid electrolyte powder. Shaping in Step (b) can be carried out by various techniques, such as pressing (e.g., metallic mold pressing or rubber pressing), and preferably by metallic mold pressing. The temperature drop rate of cooling after melting the solid electrolyte powder in Step (b) is preferably 10 to 1000° C./h and more preferably 10 to 100° C./h.

EXAMPLES

The present invention will be more specifically described by the following examples.

Examples 1 to 3

(1) Providing Raw Material Powder

A raw material mixing powder was obtained by mixing $Li_2SO_4$ powder (a commercialized product with a purity of 99% or more), LiOH powder (a commercialized product with a purity of 98% or more), and $Li_3BO_3$ (a commercialized product with a purity of 99% or more) so as to be molar ratios shown in Table 1. These powders were handled in a glove box under an Ar atmosphere at a dew point of −50° C. or less, and a sufficient care was taken to prevent alternation, such as moisture absorption.

(2) Mechanical Milling

In the glove box under the Ar atmosphere, the raw material mixing powder and 10 zirconia balls (a diameter of 10 mm) were placed into a 45 ml zirconia pot, which was then completely sealed. This zirconia pot was attached to a planetary ball mill machine, and mechanical milling was carried out at a rotation speed of 400 rpm for 50 hours to synthesize solid electrolyte powder.

(3) Metallic Mold Pressing

The resulting solid electrolyte powder was subjected to metallic mold pressing under a pressure of 750 MPa to form a pelletized solid electrolyte having a diameter of 10 mm and a thickness of 0.5 mm.

(4) Evaluation

The following evaluations were carried out on the resulting solid electrolyte.

<X-Ray Diffractometry>

The solid electrolyte was analyzed by X-ray diffractometer (XRD, X-ray source: CuKα radiation) to obtain an X-ray diffraction pattern. Note that metal Si powder was added as an internal standard to adjust the 2θ position. The resulting X-ray diffraction pattern was compared with 032-0598 in the ICDD database to identify a $3LiOH \cdot Li_2SO_4$ crystal phase and determine the presence or absence of $3LiOH \cdot Li_2SO_4$. Based on the resulting XRD profile, a full-width at half-maximum of the peak in the vicinity of 2θ=18.4° identified as $3LiOH \cdot Li_2SO_4$ was calculated. Furthermore, the ratio of the peak intensity $I_{LiOH}$ in the vicinity of 2θ=20.5° identified as LiOH to the peak intensity $I_{LHS}$ in the vicinity of 2θ=18.4° identified as $3LiOH \cdot Li_2SO_4$ ($I_{LiOH}/I_{LHS}$) was calculated. Similarly, the ratio of the peak intensity $I_{Li2SO4}$ in the vicinity of 2θ=22.2° identified as $Li_2SO_4$ to the peak intensity Lis in the vicinity of 2θ=18.4° identified as $3LiOH \cdot Li_2SO_4$ ($I_{Li2SO4}/I_{LHS}$) was calculated. The results were as shown in Table 1.

<Ion Conductivity and Conductivity Retention Ratio after being Held at 150° C. for 100 Hours>

The lithium ion conductivity of the solid electrolyte was measured using the common AC impedance measurement as follows. First, a solid electrolyte was sandwiched between two stainless steel (SUS) electrodes under an Ar atmosphere and put in a cell (coin cell CR2032, manufactured by Hohsen Corp.) and sealed to produce an ion conductivity measuring cell. This ion conductivity measuring cell was put in a thermostatic desiccator at 150° C., and the conductance (1/r) was measured by an AC impedance method using an AC impedance measurement apparatus (VMP3, manufactured by BioLogic Sciences Instruments). Initial lithium ion conductivity $C_0$ was calculated based on a formula of the measured value and lithium ion conductivity σ=L/r (1/A).

After the solid electrolyte was held in the ion conductivity measuring cell at 150° C. for 100 hours, lithium ion conductivity $C_1$ was measured in the same manner as above. The lithium ion conductivity $C_1$ of the solid electrolyte after being held at 150° C. for 100 hours was divided by the initial lithium ion conductivity $C_0$ and multiplied by 100 to obtain conductivity retention ratio (%) after being held at 150° C. for 100 hours.

<Chemical Analysis>

Quantitative analysis of boron and sulfur was carried out for the resulting solid electrolyte in each Example. Each of boron and sulfur was quantitatively analyzed by ICP Atomic Emission Spectroscopy (ICP-AES) with a calibration-curve method. Each analytical value of boron and sulfur was converted to moles and calculated as B/S.

Examples 4 to 20

(1) Providing Raw Material Powder

A raw material mixing powder was obtained by mixing $Li_2SO_4$ powder (a commercialized product with a purity of 99% or more), LiOH powder (a commercialized product with a purity of 98% or more), and $Li_3BO_3$ (a commercialized product with a purity of 99% or more) so as to be molar ratios shown in Table 1. These powders were handled in a glove box under an Ar atmosphere at a dew point of −50° C. or less, and a sufficient care was taken to prevent alternation, such as moisture absorption.

(2) Synthesis by Melting

The raw material mixing powder was placed in a crucible made of a high purity of alumina under an Ar atmosphere, and the crucible was set in an electric furnace and heat-treated at 430° C. for 2 hours to produce a melt. Subsequently, the melt was cooled in the electric furnace at 100° C./h to form a solidified product.

(3) Grinding in Mortar

The resulting solidified product was ground in a mortar under an Ar atmosphere to obtain solid electrolyte powder having an average particle diameter D50 of 5 to 50 μm.

(4) Melting

The solid electrolyte powder was subjected to metallic mold pressing under a pressure of 250 MPa in the glove box under an Ar atmosphere to form a pelletized solid electrolyte having a diameter of 10 mm. The pelletized solid electrolyte was sandwiched between two stainless steel (SUS) electrodes each having a diameter of 10 mm and a thickness of 0.5 mm. A 15 g weight was placed on the resulting stack, which was then heated at 400° C. for 45 minutes to melt the solid electrolyte. The melt was then cooled at 100° C./h to form a solidified body.

(5) Evaluation

The resulting solidified body (solid electrolyte) was evaluated in the same manner as in Example 1. The results were as shown in Table 1.

Results

Production conditions and evaluation results of the solid electrolytes in Examples 1 to 20 are summarized in Table 1. In Examples 1 to 20, the rate of decrease in weight is significantly low and only 1% or less in the steps of melting or mechanically milling raw material mixing powder including LiOH, $Li_2SO_4$, and $Li_3BO_3$ to synthesize the solid electrolyte and remelting the solid electrolyte powder. Thus, it is presumed that compositions of Li, O, H, S, and B that constitute the solid electrolyte remains substantially unchanged from the composition at the time of preparing the raw material powder.

Example 5 with $Li_3BO_3$ added. Thus it is presumed that boron is solid-soluted in the framework of the $3LiOH \cdot Li_2SO_4$ crystal phase. Except for the high angle shift, the results were consistent with 032-0598 in the ICDD database, indicating that the solid electrolyte identified as $3LiOH \cdot Li_2SO_4$ was included. In Examples 1, 2, 4 to 7, 9 to 13, and 15 to 20, which were synthesized by adding $Li_3BO_3$,

TABLE 1

| | Raw material blending ratio $LiOH:Li_2SO_4$: $Li_3BO_3$ (molar ratio) | Production method | Presence or absence of $3LiOH/Li_2SO_4$ by XRD | B/S (molar ratio) | $3LiOH \cdot Li_2SO_4$ XRD peak full-width at half-maximum (°) |
|---|---|---|---|---|---|
| Ex. 1 | 3:1:1 | Milling | Present | 1.0 | 0.643 |
| Ex. 2 | 3:1:0.05 | Milling | Present | 0.050 | 0.552 |
| Ex. 3* | 3:1:0 | Milling | Present | 0 | 0.561 |
| Ex. 4 | 3:1:1 | Melting | Present | 1.0 | 0.151 |
| Ex. 5 | 3:1:0.1 | Melting | Present | 0.10 | 0.129 |
| Ex. 6 | 3:1:0.05 | Melting | Present | 0.049 | 0.136 |
| Ex. 7 | 3:1:0.01 | Melting | Present | 0.010 | 0.141 |
| Ex. 8* | 3:1:0 | Melting | Present | 0 | 0.149 |
| Ex. 9 | 2.6:1:1 | Melting | Present | 1.0 | 0.155 |
| Ex. 10 | 2.6:1:0.2 | Melting | Present | 0.20 | 0.142 |
| Ex. 11 | 2.6:1:0.05 | Melting | Present | 0.048 | 0.141 |
| Ex. 12 | 2.6:1:0.01 | Melting | Present | 0.010 | 0.147 |
| Ex. 13 | 2.6:1:0.002 | Melting | Present | 0.0020 | 0.145 |
| Ex. 14* | 2.6:1:0 | Melting | Present | 0 | 0.185 |
| Ex. 15 | 4:1:0.05 | Melting | Present | 0.050 | 0.123 |
| Ex. 16 | 2.3:1:0.05 | Melting | Present | 0.050 | 0.128 |
| Ex. 17 | 2.0:1:0.05 | Melting | Present | 0.049 | 0.127 |
| Ex. 18 | 1.8:1:0.05 | Melting | Present | 0.050 | 0.110 |
| Ex. 19 | 1.5:1:0.05 | Melting | Present | 0.051 | 0.124 |
| Ex. 20 | 1.0:1:0.05 | Melting | Present | 0.048 | 0.120 |

| | $LiOH/$ $3LiOH \cdot Li_2SO_4$ XRD peak intensity ratio $I_{LiOH}/I_{LHS}$ | $Li_2SO_4/$ $3LiOH \cdot Li_2SO_4$ XRD peak intensity ratio $I_{Li2SO4}/I_{LHS}$ | Conductivity retention ratio after holding at 150° C. for 100 hours (%) | Ion conductivity after holding at 150° C. for 100 hours (S/cm$^3$) |
|---|---|---|---|---|
| Ex. 1 | 0.051 | 0 | 86 | |
| Ex. 2 | 0 | 0 | 83 | |
| Ex. 3* | 0.023 | 0 | 2 | |
| Ex. 4 | 0.142 | 0 | 100 | $1.9 \times 10^{-3}$ |
| Ex. 5 | 0.125 | 0 | 100 | |
| Ex. 6 | 0.068 | 0 | 98 | $4.7 \times 10^{-3}$ |
| Ex. 7 | 0.091 | 0 | 94 | |
| Ex. 8* | 0.091 | 0 | 75 | |
| Ex. 9 | 0.038 | 0 | 99 | |
| Ex. 10 | 0.036 | 0 | 100 | |
| Ex. 11 | 0.027 | 0 | 100 | $4.2 \times 10^{-3}$ |
| Ex. 12 | 0.044 | 0 | 98 | |
| Ex. 13 | 0.031 | 0 | 80 | |
| Ex. 14* | 0.057 | 0 | 57 | |
| Ex. 15 | 0.234 | 0 | 96 | $2.9 \times 10^{-4}$ |
| Ex. 16 | 0.022 | 0 | 97 | |
| Ex. 17 | 0 | 0.048 | 99 | $1.8 \times 10^{-3}$ |
| Ex. 18 | 0 | 0.045 | 96 | |
| Ex. 19 | 0 | 0.192 | 82 | |
| Ex. 20 | 0 | 1.03 | 81 | $1.6 \times 10^{-4}$ |

*represents Comparative Example.

The results in Table 1 will be explained in detail. The main phase of all the X-ray diffraction patterns of Examples 1 to 20 this time was consistent with 032-0598 in the ICDD database, indicating the presence of a $3LiOH \cdot Li_2SO_4$ crystal phase. The main phase here refers to a peak that is not attributed to LiOH, $Li_2SO_4$, and $Li_3BO_3$. The high angle shift of the X-ray diffraction pattern of the $3LiOH \cdot Li_2SO_4$ crystal phase was observed especially in Examples containing a high concentration of boron. For example, the peak at $2\theta=18.43°$ of $3LiOH \cdot Li_2SO_4$ in Example 8 without $Li_3BO_3$ added was peak-shifted to a high angle side of 18.46° in the chemical analysis showed that B/S became greater than 0, indicating boron was contained in the solid electrolyte.

In Examples 3, 8 and 14 without boron, the ion conductivity retention ratio was small and 75% or less. When the B/S was 0.002 or more as in Example 13, it was found that the ion conductivity retention became large and 80% or more. Comparing the ion conductivity in Examples 4 and 6 after being held at 150° C. for 100 hours, it was found that the conductivity of Example 4 was low. This was presumably due to the high content of unreacted different phases as a result of the large amount of $Li_3BO_3$ added, and it was found that B/S, which shows the amount of boron added, was preferably less than 1.0.

Next, in comparison among those having the same composition, Examples 4 and 6 produced by the melting method have larger ion conductivity retention ratio than Examples 1 and 2. Regarding the full-width at half-maximum of $3LiOH \cdot Li_2SO_4$ by X-ray diffractometry, it is presumed that Examples 4 and 6 have high crystallinity since each of the full-widths at half-maximum is narrow and are more stable as a crystal, which results in the large conductivity retention ratio. From the above, the full-width at half-maximum of $3LiOH \cdot Li_2SO_4$ is preferably 0.500 or less.

Comparing the ion conductivities of Examples 6, 11, and 15, in which LiOH is detected by XRD after being held at 150° C. for 100 hours, the ion conductivities of Examples 6 and 11 are higher than that of Example 15. Regarding the peak intensity ratio ($I_{LiOH}/I_{LHS}$) by X-ray diffractometry, it is presumed that LiOH remains as a different phase because the value of $I_{LiOH}/I_{LHS}$ is large in Example 15, and this inhibits ion conduction. Therefore, if LiOH is detected as a different phase, the peak intensity ratio ($I_{LiOH}/I_{LHS}$) is preferably 0.234 or less. Comparing the ion conductivities of Examples 17 and 20, in which $Li_2SO_4$ is detected by XRD after being held at 150° C., the ion conductivity of Example 17 is higher than that of Example 20. Regarding the peak intensity ratio ($I_{Li2SO4}/I_{LHS}$) by X-ray diffractometry, it is presumed that $Li_2SO_4$ remains as a different phase because the value of $I_{Li2SO4}/I_{LHS}$ is large in Example 20, and this inhibits ion conduction. Therefore, if $Li_2SO_4$ is detected as a different phase, the peak intensity ratio ($I_{Li2SO4}/I_{LHS}$) is preferably less than 1.1.

The following can be seen by focusing on Examples 6, 11, 17, and 20. In these Examples, all of raw material blending ratios are compositions within the range expressed by $xLiOH \cdot Li_2SO_4 \cdot yLi_3BO_3$, wherein $1.0 \leq x \leq 4$ and $0.002 \leq y \leq 1$. Moreover, since the $Li_2SO_4:Li_3BO_3$ ratio is 1:0.05, the property change caused by varying only the molar ratio of LiOH (x in the above formula) can be observed. Although Examples 6, 11, 17, and 20 all show desirable results in terms of the conductivity retention ratio after being held at 150° C. for 100 hours, the ion conductivities of Examples 6, 11, and 17, where x=3, 2.6, and 2, are higher than that of Example 20, where x=1.0. From this, the range of $2.0 \leq x \leq 4$ and $0.002 \leq y \leq 1$ is the preferred range in terms of ion conductivity.

What is claimed is:

1. A solid electrolyte, wherein the solid electrolyte is identified as $3LiOH \cdot Li_2SO_4$ by X-ray diffractometry and further comprises boron,
    wherein the solid electrolyte consists of $xLiOH \cdot Li_2SO_4 \cdot yLi_3BO_3$ and unavoidable impurities, and wherein $1.0 \leq x \leq 4$ and $0.002 \leq y \leq 1$.

2. The solid electrolyte according to claim 1, wherein a molar ratio B/S of boron B to sulfur S contained in the solid electrolyte is more than 0.002 and less than 1.0.

3. The solid electrolyte according to claim 1, wherein a full-width at half-maximum of a peak in the vicinity of $2\theta = 18.4°$ identified as $3LiOH \cdot Li_2SO_4$ is 0.500° or less in an X-ray diffraction pattern of the solid electrolyte observed with a radiation source of $CuK\alpha$.

4. The solid electrolyte according to claim 1, wherein an $I_{LiOH}/I_{LHS}$ ratio of a peak intensity $I_{LiOH}$ in the vicinity of $2\theta = 20.5°$ identified as LiOH to a peak intensity $I_{LHS}$ in the vicinity of $2\theta = 18.4°$ identified as $3LiOH \cdot Li_2SO_4$ is less than 0.234 in the X-ray diffraction pattern of the solid electrolyte observed with the radiation source of $CuK\alpha$.

5. The solid electrolyte according to claim 1, wherein an $I_{Li2SO4}/I_{LHS}$ ratio of a peak intensity $I_{Li2SO4}$ in the vicinity of $2\theta = 22.2°$ identified as $Li_2SO_4$ to the peak intensity $I_{LHS}$ in the vicinity of $2\theta = 18.4°$ identified as $3LiOH \cdot Li_2SO_4$ is less than 1.10 in the X-ray diffraction pattern of the solid electrolyte observed with the radiation source of $CuK\alpha$.

6. The solid electrolyte according to claim 1, wherein the solid electrolyte is a melt-solidified body.

7. A method for manufacturing the solid electrolyte according to claim 1, comprising a step of melting and then cooling a raw material including LiOH, $Li_2SO_4$ and $Li_3BO_3$ to form a solidified body.

8. A method for manufacturing the solid electrolyte according to claim 1, comprising a step of
    mixing and grinding a powder including LiOH, $Li_2SO_4$, and $Li_3BO_3$ by mechanical milling to synthesize a solid electrolyte powder.

* * * * *